United States Patent [19]
Korth

[11] 3,866,038
[45] Feb. 11, 1975

[54] APPARATUS FOR MEASURING SURFACE FLATNESS

[75] Inventor: Hans E. Korth, Stuttgart, Germany

[73] Assignee: International Business Machines Corporation, Armonk, N.Y.

[22] Filed: Nov. 13, 1973

[21] Appl. No.: 415,475

[30] Foreign Application Priority Data
Nov. 18, 1972 Germany............................. 2256736

[52] U.S. Cl................... 250/236, 250/563, 356/120
[51] Int. Cl. ............................................. H01j 3/14
[58] Field of Search ............ 356/120; 250/562, 563, 250/572, 234, 235, 236; 178/7.6

[56] References Cited
UNITED STATES PATENTS

| | | | |
|---|---|---|---|
| 3,023,900 | 3/1962 | Thier ................................. | 250/236 |
| 3,198,951 | 8/1965 | Lentze ............................... | 250/563 |
| 3,360,659 | 12/1967 | Young ................................ | 250/236 |
| 3,705,755 | 12/1972 | Baer.................................... | 250/236 |
| 3,781,078 | 12/1973 | Wildhaber ......................... | 178/7.6 |

Primary Examiner—James W. Lawrence
Assistant Examiner—D. C. Nelms
Attorney, Agent, or Firm—Edward S. Gershuny

[57] ABSTRACT

The flatness of a surface is measured using a scanning beam of light. For scanning the surface, a light beam is periodically deflected by a rotating polygonal mirror. The periodic displacement of the scanning beam reflected on the surface is fully compensated by its reflection on the same face of the polygonal mirror. As a consequence, a beam leaves the polygonal mirror substantially on the same path and in the opposite direction as the beam exiting from a light source such as a laser. If the scanning beam reflected from the surface impinges on an embossment or recess the reflected beam is displaced perpendicularly to the scan direction, this displacement not being compensated by its reflection on the polygonal mirror. This displacement, which is a function of the distance of the scanned point from a perfectly plane surface, is sensed by a linear array of photodetectors.

5 Claims, 4 Drawing Figures

3,866,038

3,866,038

APPARATUS FOR MEASURING SURFACE FLATNESS

BACKGROUND OF THE INVENTION

The invention relates to an automatic process for measuring flatness in accordance with the light section method, and to a device for carrying out said process.

In many technical fields, the smoothness and the peak-to-valley height (roughness) of polished or otherwise precision-processed workpiece surfaces have to be continuously checked. Particularly in connection with the manufacture of printed circuits on ceramic substrates and of integrated circuits, continuous controls are required so as to ensure that the substrates serving as base material show the necessary surface properties and smoothness, prior to the starting of the manufacturing process and also before and after each of the individual procedural steps.

In most cases, the surfaces have to be examined repeatedly without leaving any gaps and with great precision. For that purpose, mechanical sensing lever devices must be excluded from the start owing to the great amount of time they require, and the risk of damaging the examined surfaces. Nor can the contact-free moire, interference, and light section processes be used because of the high amount of time they involve and the difficulty of automization.

The light section method which is particularly suitable for exactly measuring individual points of a profile could not be used in its hitherto known form on account of the very long period of time it involves. The known method of line-by-line scanning, by means of a periodically deflected light beam which is very quick and well suited for automation, also had to be excluded because of its low precision. Tests which were made to increase the speed of the known light section method by some powers of ten, and to open it to automatic interpetation by using a periodically deflectable light beam for the line-by-line scaning failed in view of the fact that the positional changes of the scanning beam caused by the scanning motion, especially the positional changes of the scanning beam reflected or scattered at the surface to be measured, considerably reduced the measuring precision when the light section method is applied. As the light section method and the scanning by means of a periodically displaceable or pivotable light beam each have their individual advantages, which for the purposes specified above are not even approximated by any other process, an object of the invention is to provide apparatus which will enable use of the light section method and the scanning by means of a light beam moved periodically with high speed in such a manner that the advantages of both methods are fully maintained whereas their disadvantages are avoided.

SUMMARY OF THE INVENTION

According to one aspect of the invention, the above and other objects are achieved by apparatus for measuring flatness in accordance with the light section proceess, said method being characterized in that a scanning beam impinging on a surface to be measured is periodically moved over this surface by means of a deflecting element, that the illumination reflected or scattered at this surface (said illumination differing from the impinging illumination in a specific property, as direction, position, state of polarization, wavelength, etc.) is redirected on said deflecting element in such a manner that it leaves it on a path which is independent of the deflection position of the deflecting element, and which is also a function of the height of each respective scanned area, and that this illumination is applied to a detector device for determining its position.

As according to the invention the scanning movement of the beam effected by the deflecting element is fully compensated by this same, or a similar second element operating synchronously, the displacement of the scanning beam effected in the light section method as a function of the height of the respective point scanned, can be fully evaluated automatically and free of disturbing influences, as a measuring quantity. As furthermore there are no displacements of the reflected or scattered beam within the range of the detector device which might be caused by the scanning movement of the beam, this detector device can be of maximum sensitivity while being of a very simple structure.

A particularly advantageous version of the invention is characterized in that the illumination scattered or reflected at the surface to be measured, and applied to the deflecting element, as well as the illumination from the deflecting element towards the surface to be measured move on the same path when they impinge on, or leave, the deflecting element.

Another version of the invention is characterized in that the illumination scattered or reflected at the surface to be measured, and re-applied to the deflecting element, and the illumination from the deflecting element towards the surface to be measured moves on different paths when impinging on, or leaving, the deflecting element. Still another version of the invention is characterized in that the height of each scanned point of the surface to be measured is defined by the position of the point of incidence on the deflecting element of the illumination reflected or scattered at this surface. Instead of the spatial position of the point of incidence on the deflecting element, the angular position of the illumination impinging on the deflecting element can also be used as a measure for the height of the respective point scanned.

A device particularly suitable for carrying out the invention is characterized by an element for periodically deflecting a scanning beam, which element, upon a renewed application of the scanning beam, compensates the deflection it effected with the first application, by a first mirror placed in parallel to the deflection direction of the scanning beam, inclined against the surface to be scanned, and directing the scanning beam at an acute angle to the surface to be scanned, a second mirror again directing to the deflecting element the beam reflected or scattered at the surface to be scanned, and an arrangement consisting of several photosensitive elements for determining the displacement, which represents a function of the height of the respective point scanned, or the beam leaving the deflecting element for a second time.

Yet another embodiment of the invention is characterized in that the deflecting element consists of an electro-optical or electro-acoustical beam deflector.

Still another embodiment of the invention is characterized by a lens which is arranged between the deflecting element and the surface to be scanned, and which focuses through the deflecting element the scanning beam onto the surface to be scanned and the beam scattered or reflected at this surface onto the detector arrangement consisting of several photosensitive elements.

Yet another advantageous embodiment of the invention is characterized by a beam deflector designed as a rotating mirror, a lens in the path of the deflected beam for focusing the periodically deflected beam onto the surface to be scanned, a glass cone arranged in the path of this beam, a first mirror arranged in parallel to the scanning direction of the beam, inclined against the surface to be scanned and directing the beam at an acute angle onto the surface to be scanned, a second mirror again directing the beam reflected or scattered at the surface to be scanned through the lens onto the rotating mirror, a lens system for focusing this beam onto a photosensitive element of an arrangement consisting of several photosensitive elements which detect the displacement of the beam leaving the deflecting element for the second time, said displacement being a function of the height of each scanned point.

The foregoing and other objects, features and advantages of the invention will be apparent from the following more particular description of preferred embodiments of the invention, as illustrated in the accompanying drawings.

DETAILED DESCRIPTION

Figure 1:
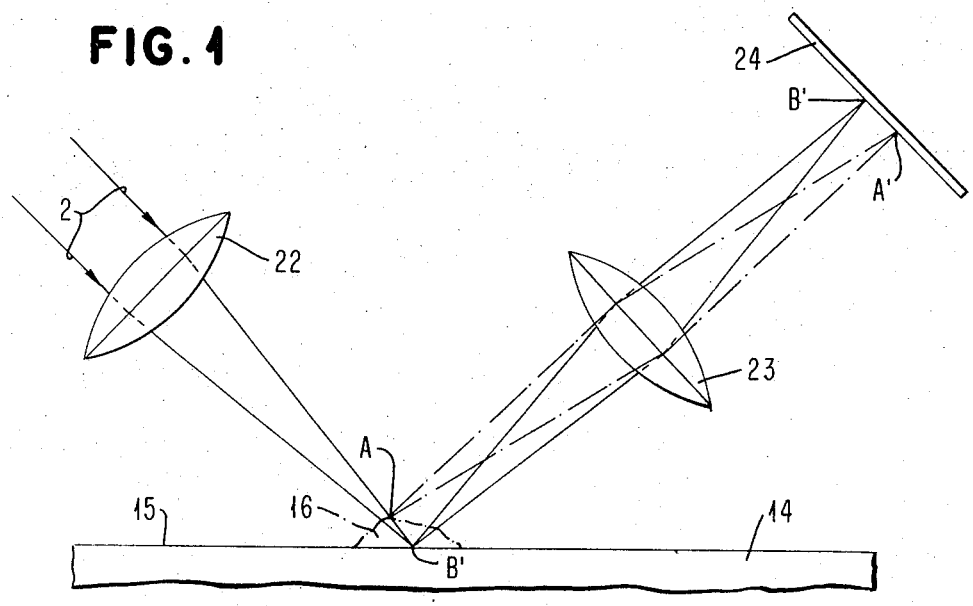
FIG. 1 is a schematic representation for showing the light section method.

As shown in FIG. 1, a beam 2 which propogates in the direction of the arrows from the left-hand upper corner to the right-hand lower corner is directed through a microscope objective 22 onto the upper surface 15 of a wafer 14. If this surface, as shown by full line 15, is smooth, the beam is reflected or scattered at point B, and focused through another microscope objective 23 onto an observation screen 24 at point B'. However, if the beam focused through microscope objective 22 impinges on an embossment (shown in FIG. 1 by dash-dotted linne 16), it is scattered or reflected at point A and focused through the second microscope objective 23 on the observation screen 24 within the range of point A'. The spacing between points A' and B' is a function of the height of point A on the embossment represented by dash-dotted line 16. For a complete scanning of the upper surface of wafer 14, said wafer would have to be laterally displaced periodically by the entire length of a scanning line, and after each such lateral displacement it would have to be displaced by one line width vertically to the drawing plane relative to objectives 22 and 23 and observation screen 24. Apart from the difficulty of displacing the wafer in the plane to be scanned without vibrations and any movements vertical thereto, such a process would also require a large amount of time. If beam 2 would be deflected by rotation mirrors or by any other deflecting elements the technical complexity for ensuring a straight deflection track, which is a condition for exact measuring results, would be very great. Besides, the detectors for determining the position of points A' and B' would have to be the length of a scanning track approximately, and this demand cannot be readily fulfilled if high precision is to be achieved.

Figure 2:
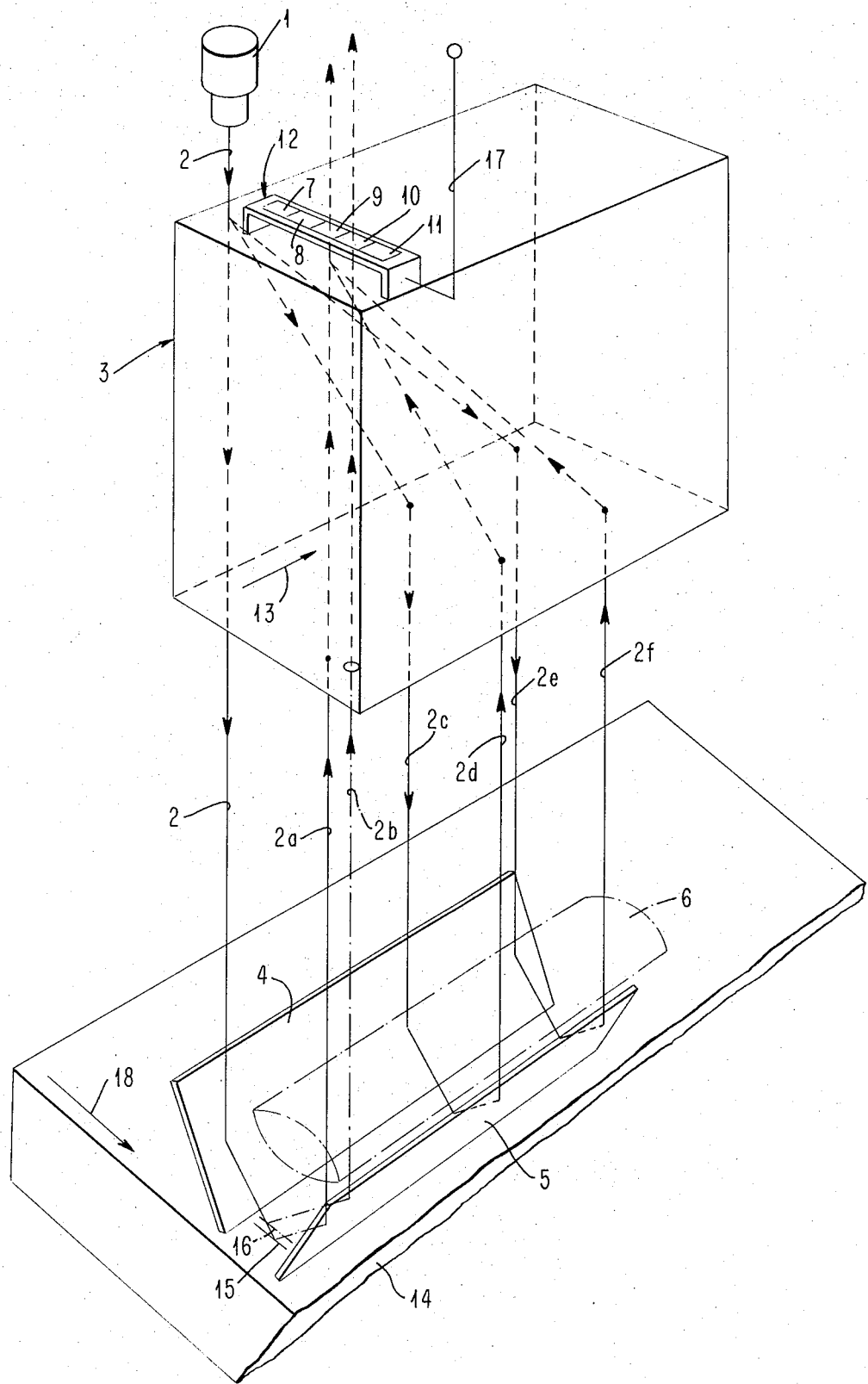
FIG. 2 is a schematic representation of a particularly simple embodiment of the invention.

These disadvantages are avoided by the arrangement of FIG. 2. The embodiment of this FIG. consists of a laser 1, an electro-optical arrangement 3 for controllably deflecting a ligt beam 2, two deflector mirrors 4 and 5, and an arrangement 12 consisting of individual photosensitive elements 7 through 11. Arrangement 3 which controllably deflects light beam 2 (and which may for instance, be an acusto-optical deflector or a light deflector consisting of elements for the controllable rotation of the polarization plane and of birefringent elements) is of such a design that the deflection of a light beam passing through it in one direction is completely compensated upon a second passage in opposite direction. Beam 2 which exists from laser 1 and which consists of sharply focused parallel light is periodically deflected in the direction of arrow 13 by the electro-optical device, and after reflection at mirror 4 it impinges at approximately 45° upon the surface of a wafer 14 which is to be measured. In that process a light spot is formed which scans wafer 14 periodically along a straight line which is parallel to mirrors 4 and 5. After reflection or scattering at this surface, the light is again directed onto electro-optical arrangement 3, via mirror 5 and lens 6, for controllable deflection, and passes therethrough for a second time in the opposite direction. With that, the deflection of the first passage is compensated so that the beam leaves the upper side of arrangement 3 at a point which is distanced from the point of entry of beam 2 exiting from laser 1 by an amount equalling the distance between the points of impingement of the beam on mirrors 4 and 5. Therefore, when the scanned surface, as indicated by full line 15, is completely smooth this beam impinges on photosensitive element 9 of arrangement 12. If, however, the scanned surface of wafer 14 shows an embossment (as indicated by the dsh-dotted line 16), beam 2 which had been scattered or reflected there is reflected at a spot of mirror 5 which is higher and thus at a greater distance from the point of impingement on 4, and it thus reaches as beam 2b the lower side of arrangement 3 which it enters at a spot the distance of which from the point of entry of beam 2a is a function of the height of the embossment indicated by line 16. As in arrangement 3, upon the second passage, only the deflection of the first passage of beam 2 is compensated, beam 2b leaves the uper side of arrangement 3 displaced relative to beam 2a, and it impinges on the photosensitive element 10 of arrangement 12 at whose output 17 there appears an electric signal giving the height of the embossment indicated by dash-dotted line 16. If the embossment is high, the beam impinges on photosensitive element 11, and if there is a recess it will impinge on one of photosensitive elements 7 or 8. If desired, the number of photosensitive elements of arrangement 12 can be increased so as to increase the precision of the measuring process. It may also be desirable to image the scanning beam leaving arrangement 3 through a microscope objective on photosensitive arrangement 12. The same situation is applicable to beams 2c to 2f. If wafer 14 is moved simultaneously in the direction of arrow 18 the signals at output 17 represent the profiles of wafer 14 along the lines scanned by beam 2 reflected at mirror 4. If the scanned surface of wafer 14 is of high reflection, cylindrical lens 6 might become superfluous. However, it might equally be suitable to arrange, innstead of cylindrical lens 6 which is provided only in the path of beams 2a, 2b, 2d, and 2f reflected at mirror 5, a cylindrical or spherical lens arranged in the path of all beams. As the deflection of a light beam in arrangement 3 (for example, of light beams 2c and 2e), is fully compensated upon the second passage of this beam in FIG. 2, (Beams 2d and 2f), arrangement 12 detects only the displacements caused by a height alteration of the surface of wafer 14 within a scanning line. The signals at output 17 of arrangement 12 are therefore entirely independent of the respective deflection adjustment of the electro-optical deflection arrangement 3.

Figure 3:
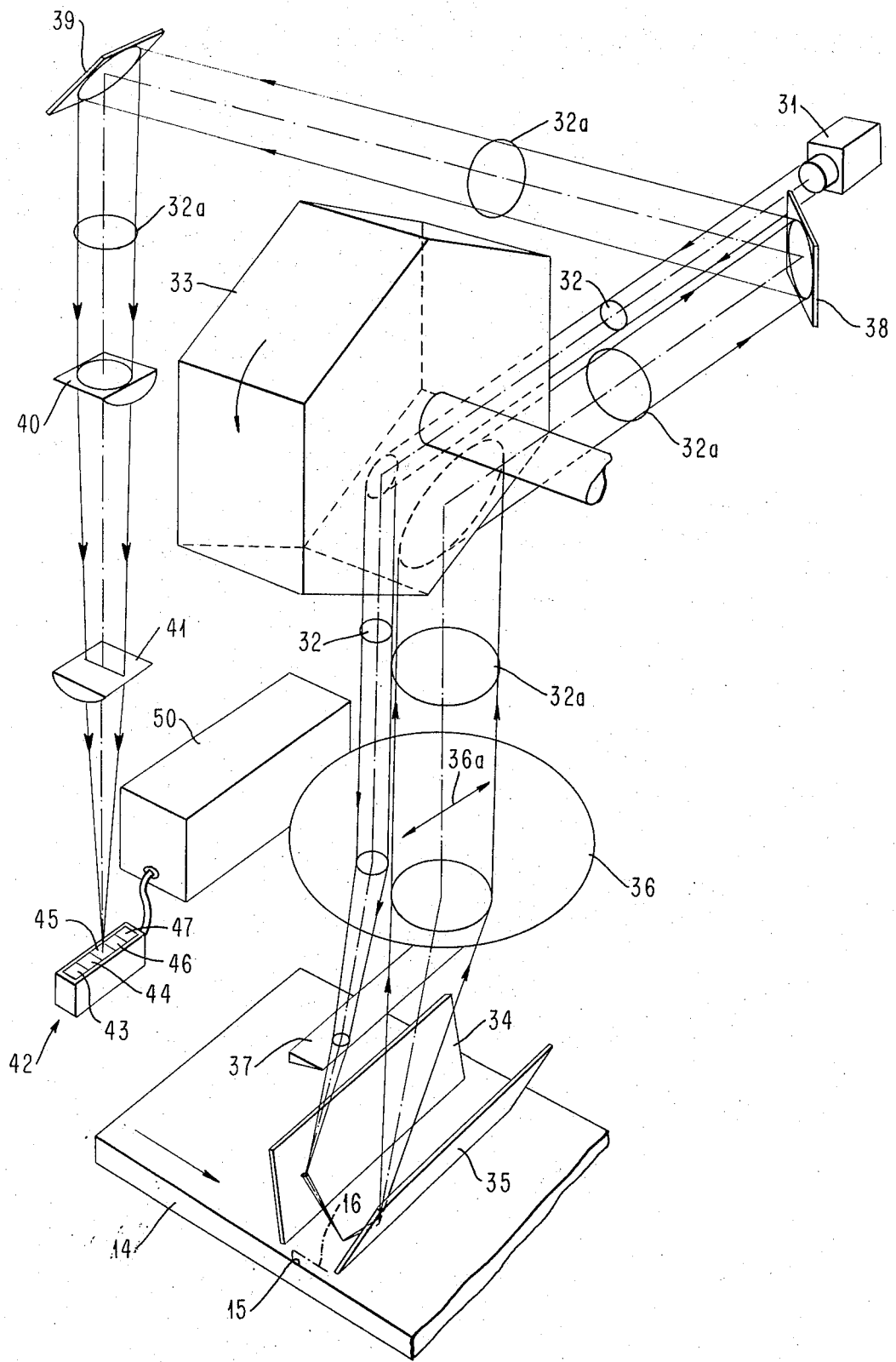

In the embodiment of FIG. 3, beam 32 existing from laser 31 impiges on a polygonal mirror 33 which is approximately in the focus of a spherical lens 36. It is equally possible to place the polygonal mirror closer to the lens but then the arrangement is less easy to understand. For the sake of simplicity therefore the abovementioned arrangement of the polygonal mirror in the focal plane of the lens has been selected. Owing to the rotation of polygonal mirror 33 beam 32 reflected there is moved periodically in the direction of arrow 36a. As beam 32, owing to the rotation of polygonal mirror 33, is periodically pivoted round a straight line extending vertically to the optical axis of lens 36, and through its focus, it leaves the lower side of this lens as a beam which is moved periodically in parallel to the optical axis, and which, after having passed through a glass prism 37, and having altered its direction, impinges on a mirror 34 and is then focused, at an angle of approximately 45°, onto the surface 15 of a wafer 14. The beam reflected or scattered at that wafer in the focal plane of lens 36 is applied via a second deflection mirror 35 to lens 36 as beam 32a. As the point of divergence of this beam is approximately in the focal plane of lens 36 it leaves this lens in the direction of the polygonal mirror 33 as a parallel beam the direction of which practically does not differ from the direction of beam 32 reflected from the polygonal mirror. As shown in FIG. 3, this beam is directed, by the same specular susrface of polygonal mirror 33 which deflects the beam from laser 31, towards a mirror 38, the deflection of beam 32 from laser 31 effected by this specular surface of the polygonal mirror being compensated.

As shown in FIG. 3 beam 32a reflected at polygonal mirror 33 moves on a different path compared with beam 32 moving from laser 31 to the polygonal mirror. From mirror 38, beam 32a progates to a mirror 39 from which it is focused through the two cylinder lenses 40 and 41 onto a photosensitive arrangement 42 consisting of photosensitive elements 43, 44, 45, 46, and 47. As already explained in connection with the description of the device of FIG. 2, the deflection of beam 32 caused by polygonal mirror 33 is fully compensated when the beam which has been reflected or scattered at the surface of wafer 14, is again reflected at the same surface of the polygonal mirror, so that, with a completely smooth surface of the wafer, beam 32a is focused onto the same photosensitive element (in the present embodiment photosensitive element 45). However, if the scanned point of the surface of wafer 14 shows an embossment or a recess, beam 32 reflected at this point is subjected to an additional displacement which is vertical with respect to the deflection caused by polygonal mirror 33, which displacement is not compensated by the second reflection at the polygonal mirror and which thus causes a displacement of the beam focused on photosensitive arrangement 42. The details of this process were explained above in detail in connection with FIG. 2. Photosensitive arrangement 42 is connected to an electronic evaluating unit 50 by means of which digital data on the surface properties of wafer 14 can be obtained. If, in addition to the scanning movement of beam 32 in parallel to deflecting mirrors 34 and 35, wafer 14 is displaced vertically, the entire surface of interest is scanned point-by-point along closely adjacent lines, and the result of this scanning process is evaluated by arrangement 50.

Figure 4:
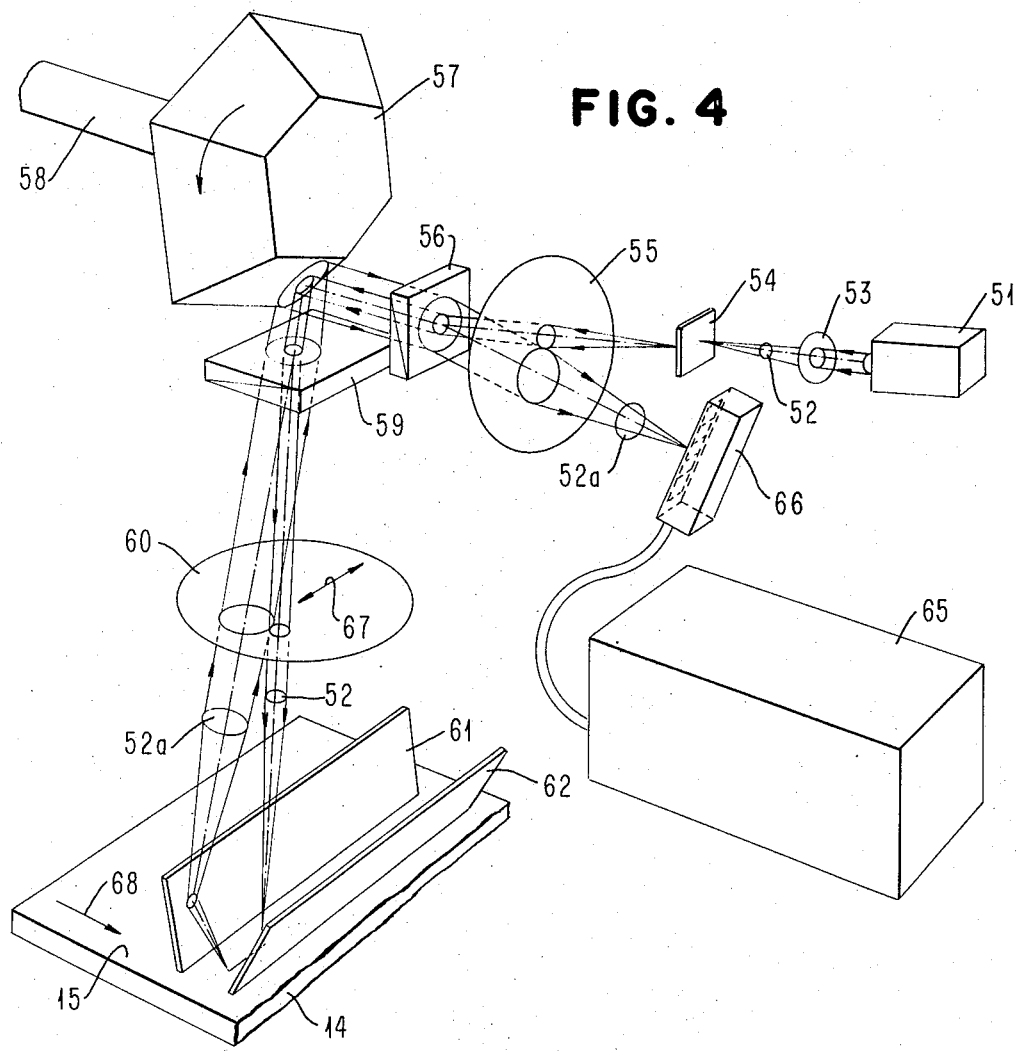
FIGS. 3 and 4 show two other embodiments of the invention.

In the embodiment of FIG. 4, a linearly polarized beam 52 exiting from laser 51 passes first through an arrangement 53 for enlarging the cross-section, a pinhole diaphragm 54, a lens 55, and a Wollaston prism 56, where, owing to the position of its polarization plane, it is subjected to a change of direction towards a polygonal mirror 57 which is driven by a motor 58. At polygonal mirror 47, beam 52 is reflected downward and periodically deflected in the direction of arrow 67. The beam reflected downwards at polygonal mirror 57 first passes through a second Wollaston prism 59 where owing to thy position of its polarization plane it is deflected towards the right, and subsequently, via a lens 60 and a deflecting mirror 62, focused on the upper surface 15 of a wafer 14 which it scans along a line parallel to mirrors 61 and 62, owing to the periodic deflection caused by polygonal mirror 57. The beam which is reflected or scattered at the upper surface of wafer 14 is partly depolarized and, via deflecting mirror 61, it again reaches lens 60 and from there passes on to Wollaston prism 59. That part of beam 52a reflected at the upper surface of wafer 14 which is vertically polarized with respect to the position of the polarization plane of beam 52 leaving Wollaston prism 59 is subjected, upon passing through the Wollaston prism, to a change of direction which makes it parallel to beam 52 emanating from polygonal mirror 57. Through the reflection at polygonal mirror 57 the deflection fo the beam in the direction of arrow 67 is fully compensated so that it leaves this mirror on a path which is parallel to beam 52 extending from the laser to the polygonal mirror. Owing to the position of its polarization plane, beam 52a exiting from polygonal mirror 57 and extending first in parallel to beam 52 is deflected downwards in Wollaston prism 56, and focused via lens 55 on a photosensitive arrangement 66 consisting of several photosensitive elements. As the periodic deflection (effected by the rotation of polygonal mirror 57) of beam 52 is fully compensated by the second reflection at polygonal mirror 57 of beam 52 exiting as beam 52a from the surface of wafer 14 its focusing is effected, independently of the deflection by polygonal mirror 57, always on the same photosensitive element of photosensitive arrangement 66. If the scanned surface (as shown, for example, schematically in FIGS. 1 and 2) shows an embossment or a recess, the beam reflected at this surface, as explained in detail in connection with the description of the embodiment of FIG. 2, will be subjected to a displacement vertically to arrows 67, which is not compensated by the second reflection at polygonal mirror 57. Therefore, the beam focused through lens 55 on photosensitive arrangement 66 impinges on another photosensitive element of this arrangement, the distance of this focusing point from the first focusing point being a measure of the distance of the scanned point from an ideal plane representing the surface of wafer 14. The electric signals at the output of photosensitive arrangement 66 are applied to an electronic evaluating device 65 which presents digital information on the characteristics of the scanned surface. If wafer 14 is moved simultaneously in the direction of arrow 68 its surface is scanned point by point along closely adjacent lines, so that in electronic evaluating device 65 digital information on the characteristics of the entire surface scanned can be made available.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Apparatus for measuring the flatness of a surface comprising:
   means for producing a beam of light;
   deflection means for producing a deflected beam by periodically deflecting said beam in a known manner, said deflection means being of such a nature that when said deflected beam is reflected back to said deflecting means, said deflected beam will be again deflected in a manner which is substantially equal and opposite to, and thus compensates for, said original deflection;
   a first mirror for reflecting said deflected beam onto said surface at a predetermined angle;
   a second mirror for reflecting said deflected beam, after it has been reflected at said surface, back toward said deflection means; and
   sensing means, positioned to receive said deflected beam after it has been deflected a second time by said deflection means, for sensing the displacement between the twice-deflected beam and the orginal beam of light;
   said displacement being a function of the height, in relation to the rest of said surface, of the point on said surface upon which said deflected beam impinged.

2. The apparatus of claim 1 wherein
   said deflection means comprises an electro-optical element.

3. The apparatus of claim 1 wherein
   said deflection means comprises a rotating polygonal mirror.

4. The apparatus of claim 3 further including:
   a spherical lens in the path of said deflected beam between said polygonal mirror and said first and second mirrors;
   a prism, in the path of said deflected beam between said spherical lens and said first mirror, for lateral deflection of said deflected beam; and
   focusing means, between said polygonal mirror and said sensing means, for focusing said twice-deflected beam upon said sensing means.

5. The apparatus of claim 3 further including:
   a first Wollaston prism in the path of said beam of light prior to its impingement upon said polygonal mirror;
   a second Wollaston prism in the path of said deflected beam between said polygonal mirror and said first and second mirrors;
   a first spherical lens in the path of said deflected beam between said second Wollaston prism and said first and second mirrors; and
   a second spherical lens, in the path of said twice-deflected beam between said first Wollaston prism and said sensing means, for focusing said twice-deflected beam onto said sensing means.

* * * * *